United States Patent
Shan et al.

(10) Patent No.: US 9,768,884 B2
(45) Date of Patent: Sep. 19, 2017

(54) MULTI-RANGE FREQUENCY-DOMAIN COMPENSATION OF CHROMATIC DISPERSION

(71) Applicant: ACACIA COMMUNICATIONS INC., Maynard, MA (US)

(72) Inventors: Peijun Shan, Maynard, MA (US); Christian Rasmussen, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/056,520

(22) Filed: Oct. 17, 2013

(65) Prior Publication Data

US 2014/0105617 A1 Apr. 17, 2014

Related U.S. Application Data

(60) Provisional application No. 61/715,215, filed on Oct. 17, 2012.

(51) Int. Cl.
- *H04B 10/00* (2013.01)
- *H04J 11/00* (2006.01)
- *H04B 10/61* (2013.01)

(52) U.S. Cl.
CPC ............................. *H04B 10/6161* (2013.01)

(58) Field of Classification Search
CPC ................................................. H04B 10/6161
USPC .......................................................... 398/208
See application file for complete search history.

(56) References Cited

U.S. PATENT DOCUMENTS

| | | | | |
|---|---|---|---|---|
| 8,233,809 B2* | 7/2012 | Qian | ................. | H04B 10/2513 398/202 |
| 8,478,135 B2* | 7/2013 | Xie | ....................... | H04B 10/611 398/147 |
| 8,526,823 B2* | 9/2013 | Swanson | ............ | H04B 10/0795 398/136 |
| 8,654,439 B2* | 2/2014 | Qian | ................. | H04B 10/2543 359/337 |
| 8,792,789 B1* | 7/2014 | Varadarajan | ....... | H04B 10/6161 398/159 |
| 8,953,951 B1* | 2/2015 | Thomas | ............. | H04B 10/6161 398/202 |
| 9,112,607 B1* | 8/2015 | Dave | ................. | H04B 10/2513 |
| 9,281,801 B2* | 3/2016 | Shibayama | ........ | H03H 17/0213 |

(Continued)

OTHER PUBLICATIONS

Tianhua et al; chromatic dispersion in coherent transmision system using digital filters; , Jul. 16, 2010, Opics Express vol. 18, No. 15 and pp. 16243-16257.*

(Continued)

*Primary Examiner* — Ken N Vanderpuye
*Assistant Examiner* — Amritbir Sandhu
(74) *Attorney, Agent, or Firm* — Wolf, Greenfield & Sacks, P.C.

(57) ABSTRACT

Disclosed herein are methods, structures, and devices that provide multi-range frequency domain compensation of chromatic dispersion within optical transmission systems that offer significant operational power savings. More specifically, a method of operating frequency domain filtering structures and circuits including FFT, frequency-domain filter multiplication and iFFT functions at a lower duty cycle for shorter overlap such that significant power savings is realized.

15 Claims, 5 Drawing Sheets

(56) References Cited

U.S. PATENT DOCUMENTS

| | | | |
|---|---|---|---|
| 2006/0159189 A1* | 7/2006 | Balakrishnan | H04L 27/2605 375/260 |
| 2006/0267812 A1* | 11/2006 | Bunin | H03M 1/145 341/120 |
| 2007/0135166 A1* | 6/2007 | Ding | H04L 5/0007 455/561 |
| 2007/0275680 A1* | 11/2007 | Kaiki | H04L 27/3863 455/184.1 |
| 2009/0041171 A1* | 2/2009 | Narahari | H04B 1/034 375/359 |
| 2009/0060093 A1* | 3/2009 | Narahari | H04L 25/03006 375/340 |
| 2009/0201796 A1* | 8/2009 | Roberts | H04B 10/60 370/210 |
| 2009/0231993 A1* | 9/2009 | Zhang | H04L 1/1671 370/210 |
| 2009/0238578 A1* | 9/2009 | Taylor | H04B 10/25133 398/147 |
| 2009/0257344 A1* | 10/2009 | Huang | H04L 27/2697 370/210 |
| 2010/0014873 A1* | 1/2010 | Bulow | H04B 10/6161 398/159 |
| 2010/0046958 A1* | 2/2010 | Awadalla | H04B 10/25137 398/149 |
| 2010/0119241 A1* | 5/2010 | Yang | H04B 10/60 398/208 |
| 2010/0142952 A1* | 6/2010 | Qian | H04B 10/2513 398/65 |
| 2010/0196017 A1* | 8/2010 | Tanimura | H04B 10/6971 398/159 |
| 2010/0329683 A1* | 12/2010 | Liu | H04B 10/2513 398/81 |
| 2011/0019833 A1* | 1/2011 | Kuech | G10L 21/0208 381/66 |
| 2011/0194855 A1* | 8/2011 | Batshon | H04B 10/60 398/65 |
| 2011/0200339 A1* | 8/2011 | Komaki | H04B 10/61 398/208 |
| 2011/0305453 A1* | 12/2011 | Hauske | H04B 10/2513 398/38 |
| 2012/0128376 A1* | 5/2012 | Sun | H04B 10/6162 398/208 |
| 2012/0143935 A1* | 6/2012 | Xie | H03H 17/0294 708/301 |
| 2012/0148265 A1* | 6/2012 | Chang | H04B 10/6161 398/208 |
| 2012/0219302 A1* | 8/2012 | Sun | H04B 10/6161 398/208 |
| 2012/0263481 A1* | 10/2012 | Ip | H04B 10/2543 398/193 |
| 2014/0064732 A1* | 3/2014 | Kai | H04B 10/6161 398/76 |
| 2015/0139648 A1* | 5/2015 | Striegler | H04L 12/12 398/65 |
| 2016/0080084 A1* | 3/2016 | Boertjes | H04B 10/25073 398/65 |
| 2016/0094292 A1* | 3/2016 | Mochizuki | H04B 10/6165 398/208 |
| 2016/0140083 A1* | 5/2016 | Shibayama | G06F 17/142 708/300 |

OTHER PUBLICATIONS

Kudo et al, Two-stage Overlap Frequency Doamin Equalization fro Long-haul Optical Systems, 2009 OSA.*

Xu et al, Chroamtic dispersion compensation in coherent transmission system using digital filters, Jul. 2010, OSA, pp. 16243-16257.*

Kudo et al; Two-Stage Overlap Frequency Domain Equalization fro Long-haul optical systems, 2009, Optical society of America.*

Xu et al; Chromatic dispersion compensation in coherent transmission system using digital filters, Jul. 2010, Optical society of America, pp. 16243-16257.*

* cited by examiner

US 9,768,884 B2

MULTI-RANGE FREQUENCY-DOMAIN COMPENSATION OF CHROMATIC DISPERSION

CROSS REFERENCE TO RELATED APPLICATIONS

This application claims the benefit of U.S. Provisional Patent Application Ser. No. 61/715,215 filed Oct. 17, 2012 which is incorporated by reference in its entirety as if set forth at length herein.

TECHNICAL FIELD

This disclosure relates generally to the field of optical communications and in particular to the electrical compensation of chromatic dispersion (CD) in an optical communication receiver over multiple ranges of dispersion value and/or multiple ranges of transmission distance.

BACKGROUND

The management of chromatic dispersion in contemporary optical communications systems has been—and continues to be—the subject of much investigative study. Accordingly, methods that facilitate such management represent a welcome addition to the art.

SUMMARY

An advance in the art is made according to an aspect of the present disclosure directed to methods, structures and systems that provide chromatic dispersion compensation to optical systems. More specifically, a method of operating frequency domain filtering structures and circuits including FFT, frequency-domain filter multiplication and iFFT functions at a lower duty cycle for shorter overlap such that significant power savings are realized.

Accordingly, disclosed is a method for the multi-range, frequency-domain compensation of chromatic dispersion of an optical signal received at an optical receiver, said optical receiver including a Fast Fourier Transform (FFT) component, a frequency-domain filter coefficient multiplication component, and an inverse Fast Fourier Transform (iFFT) component, said method comprising the steps of: receiving the optical signal and down-converting it to a baseband and quantized quadrature digital signal; removing any residual carrier frequency offset from the quadrature digital signal; applying the quadrature digital signal in a block-wise manner to the FFT component such that a transformed signal is produced, said FFT device being configured to provide a desired length of overlap to the applied digital signal, said overlap being smaller than or equal to half the length of the block, wherein said overlap length is determined based upon the length of a dispersion channel impulse response at a maximum dispersion value for a range of dispersion and transmission distance, wherein said FFT device is placed into a power-saving state during any gaps of operation related to said length of overlap and the range of dispersion and transmission distance; applying the transformed signal to the multiplication structure such that appropriate frequency-domain filter coefficients are multiplied to the FFT signal to compensate the chromatic dispersion, wherein said multiplication structure is placed into a power-saving state during any gaps of operation related to said length of overlap and the range of dispersion and transmission distance; applying multiplication result blocks block-wise to the iFFT structure such that both desired compensated data and undesired overlap data are produced, wherein said wherein said iFFT is placed into a power-saving state during any gaps of operation related to said length of overlap and the range of dispersion and transmission distance; wherein said power-saving state includes turning-off the clock and power supply to the structures.

BRIEF DESCRIPTION OF THE DRAWING

A more complete understanding of the present disclosure may be realized by reference to the accompanying drawings in which.

DETAILED DESCRIPTION

Figure 1:
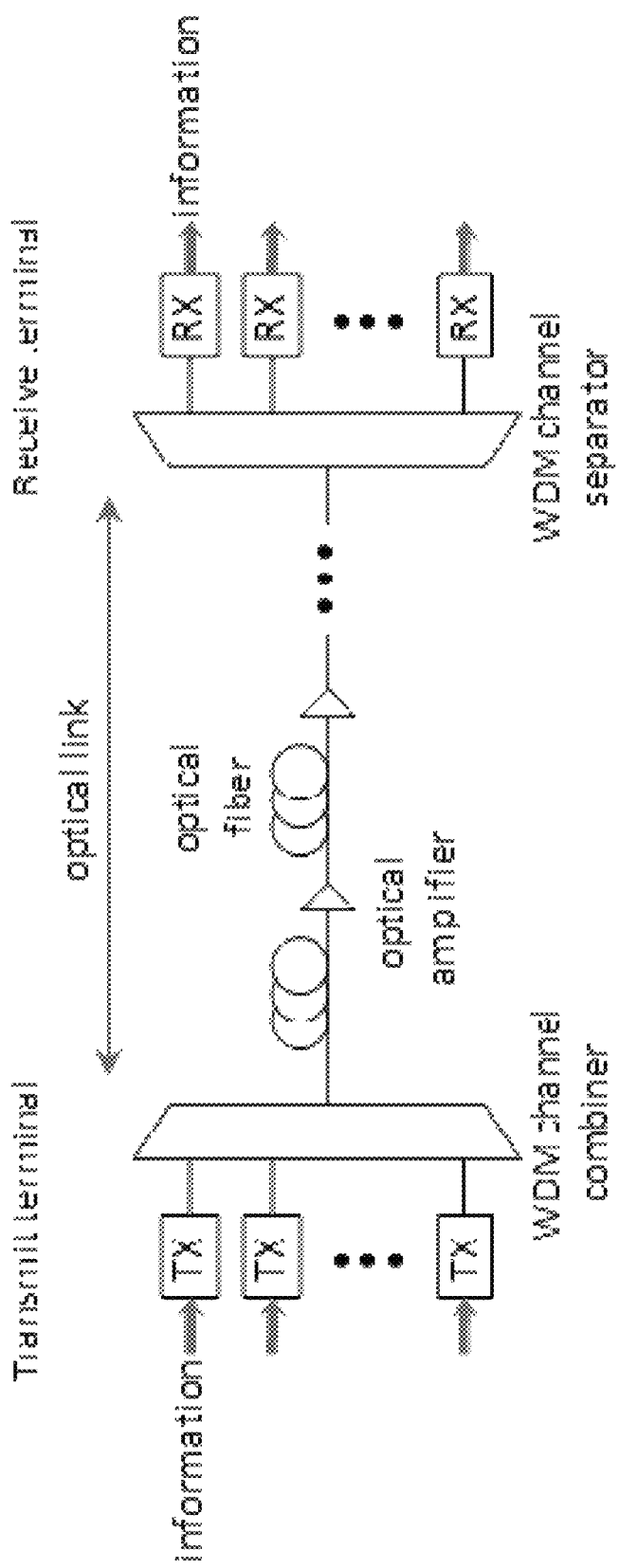
FIG. 1 shows a schematic of a Prior Art optical transmission system.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, and with initial reference to FIG. 1, there is illustrated a prior art optical transmission system depicting two terminals namely, a transmit terminal and a receive terminal optically interconnected by an optical link including one or more optical fiber spans and optical amplifiers. As may be readily understood—in a contemporary optical transmission system—the transmit terminal includes one or more optical transmitters that modulate optical carriers with information to be conveyed to receivers located at/within the receive terminal. Individual optical carriers—oftentimes referred to as wavelength division multiplex (WDM) channels, are combined optically and launched into the optical link where they co-propagate. As is known, the WDM channels are attenuated as they co-propagate through the optical fiber thereby necessitating the inclusion of the optical amplifiers to compensate any loss and restore the power of the WDM channel (s). At the receive terminal, the optical carriers are separated optically and demodulated individually in the optical receivers.

As will be readily understood and appreciated by those skilled in the art, optical transmission systems such as that illustrated in FIG. 1 is useful for long-haul and submarine applications involving distances of thousands of kilometers (or more). For metro and/or regional applications where the distances are only hundreds of kilometers or less, the transmission system configuration may be simpler, for example, optical amplifiers may not be needed and each fiber may only convey a single channel/carrier.

Figure 2:
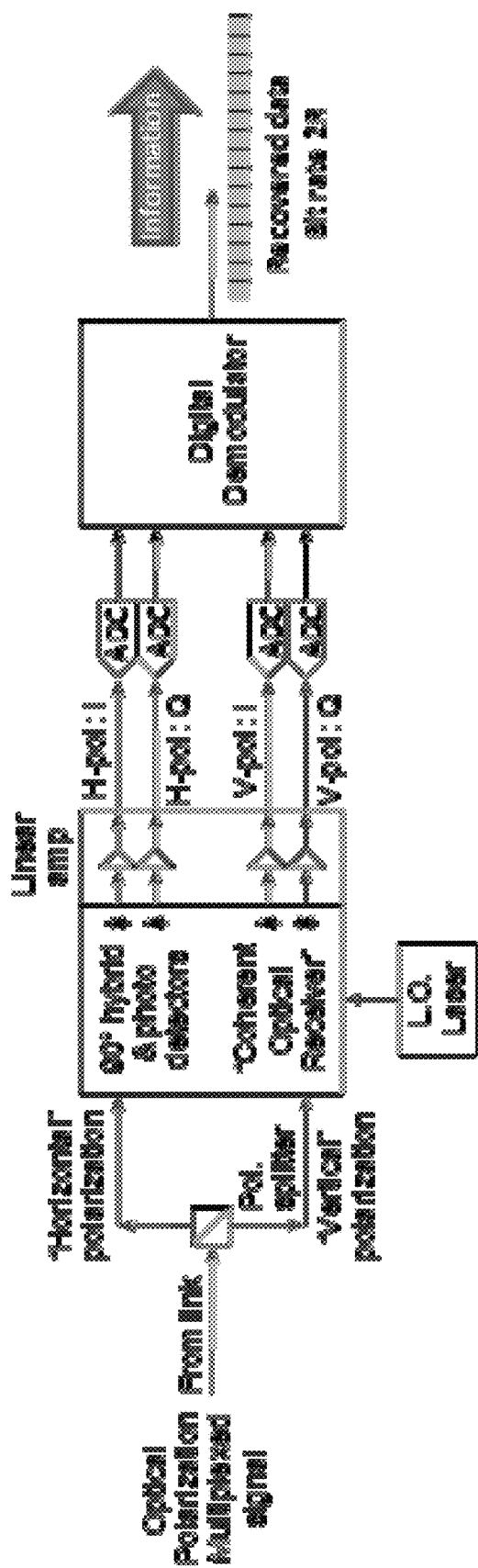
FIG. 2 shows a schematic of an exemplary optical receiver.

Turning now to FIG. 2, there is shown a schematic illustration of an optical receiver according to an aspect of the present disclosure. As shown in that schematic, such an exemplary receiver includes a polarization splitter, a local oscillator (laser), a coherent optical receiver including 90 degree hybrid and photodetectors, a series of linear amplifiers and analog to digital converters and a digital demodulator.

Operationally, an incoming polarization multiplexed signal is split through the effect of polarization splitter into two nominally orthogonal polarization components that are depicted in FIG. 2 as "horizontal" ("H") and "vertical" ("V"). In the coherent optical receiver block, the H and V components are mixed with local oscillator laser signal and down-converted to baseband in-phase (I) and quadrature (Q) components through the effect of quadratic detection in the photodetectors.

As may be understood, the frequency of the local oscillator is nominally equal to the carrier frequency of the optical signal received from the transmitter. After appropriate linear amplification with optional gain control, I and Q components of the H and V polarizations are sampled in analog-to-digital converters such that they may be further processed in the digital domain. Our experience has shown that suitable receiver performance is achieved with two samples per symbol (per polarization). Notwithstanding this observation, it is possible to under-sample with some performance loss.

Figure 3:
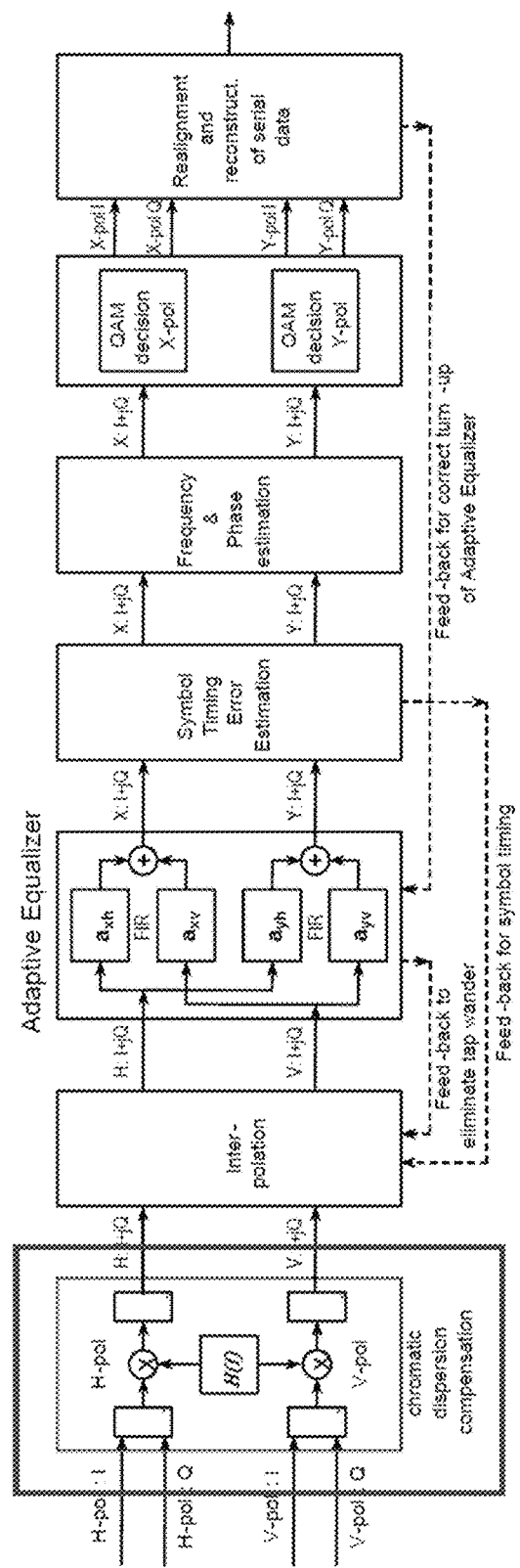
FIG. 3 shows a schematic of an exemplary digital demodulator.

With reference now to FIG. 3, there is shown a schematic block diagram of an exemplary digital demodulator. As may be understood from examination of that figure, before all other digital processing functions such as polarization discovery, adaptive equalization, time and frequency synchronization, the I and Q samples are processed through the effect of a chromatic dispersion compensation block which—as its name implies—compensates for chromatic dispersion. This chromatic dispersion compensation may be done efficiently in the frequency domain by applying a frequency response filter H(f), after FFT functional blocks convert samples from time-domain to frequency domain and prior to iFFT functional blocks converting the frequency domain result(s) into the time-domain.

Figure 4A:
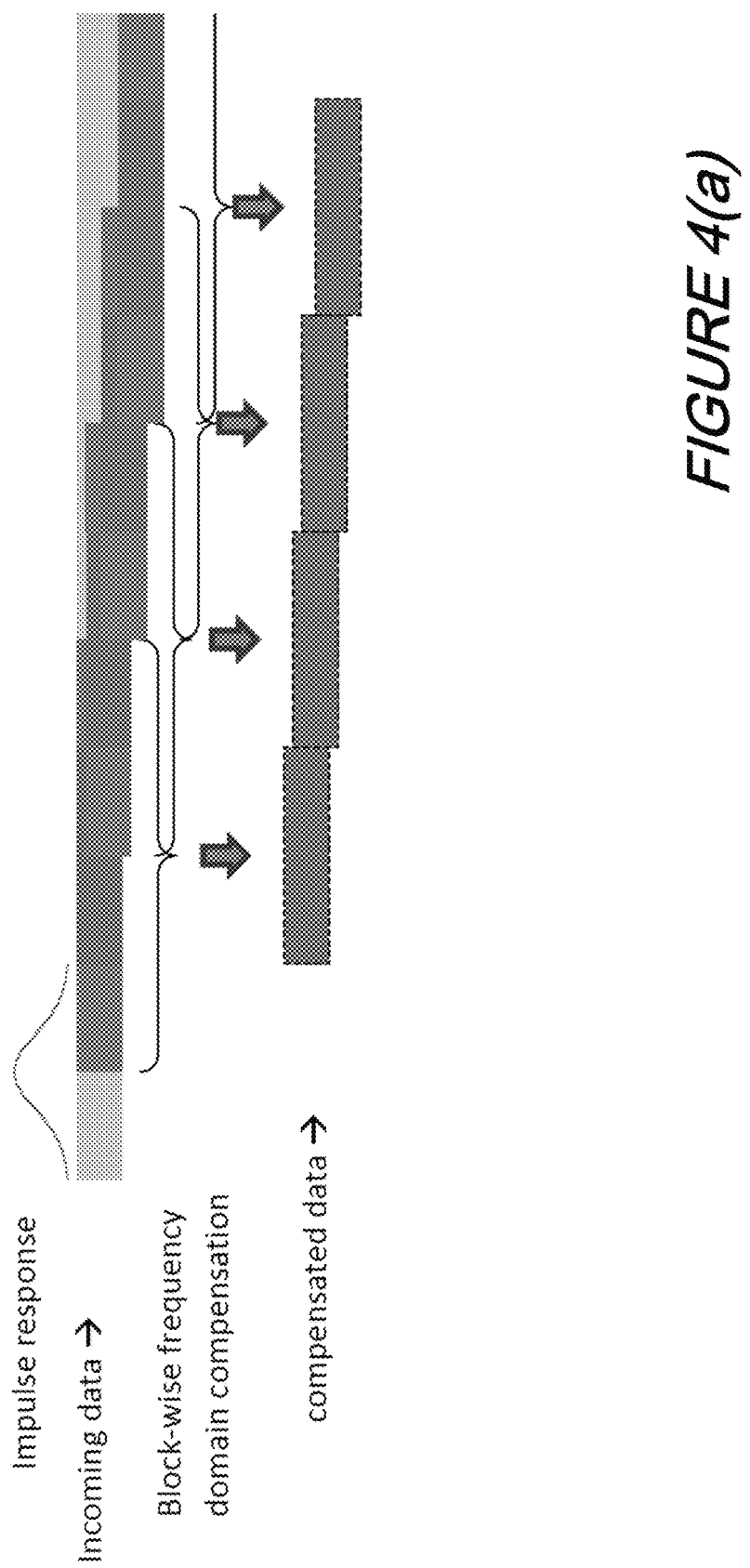
FIG. 4(a) shows a schematic illustration of an "overlap-save" scheme according to an aspect of the present disclosure wherein the overlap is ½ of the block size.
Figure 4B:
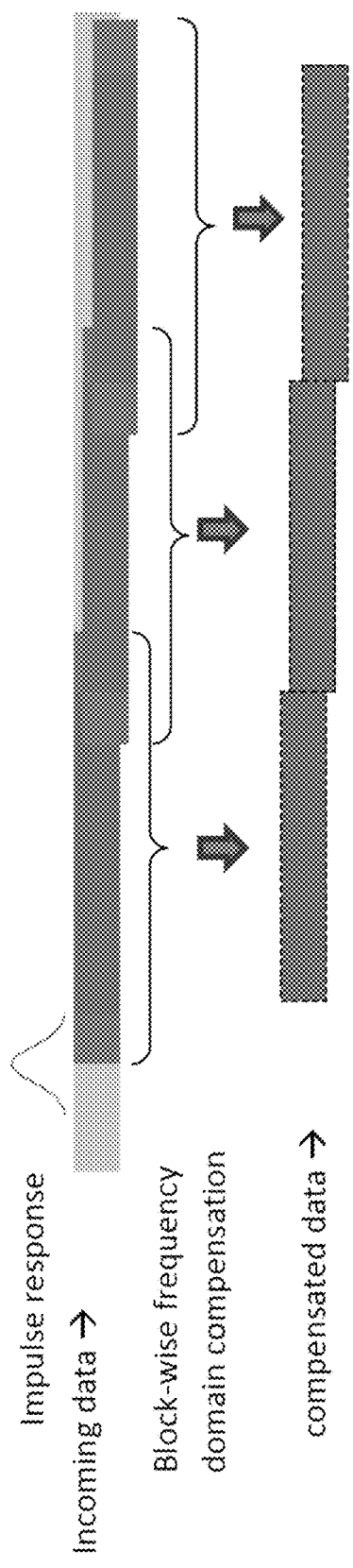
FIG. 4(b) shows a schematic illustration of an "overlap-save" scheme according to an aspect of the present disclosure wherein the overlap is ¼ of the block size.

According to an aspect of the present disclosure—and with simultaneous reference now to FIGS. 4(a) and 4(b) that depict "overlap-save" schemes having an overlap of ½ of the block size (4(a)) and an overlap of ¼ of the block size (4(b)), it is noted that the FFT is performed on incoming data blocks of size N samples, as well as the frequency-domain filter coefficient multiplication and iFFT. Assuming a total overlap of L samples between FFT blocks adjacent in time, each block of data contains (N-L) useful output data samples.

As may be observed from those figures, an impulse response is represented by incoming data organized into blocks of size N. Blocks adjacent in time overlap one another by a particular amount. As noted in FIGS. 4(a) and 4(b), the exemplary overlaps depicted are ½ of the block size and ¼ of the block size, respectively. A block-wise frequency domain compensation is performed on the block-wise data producing a set (block) of compensated data for each of the blocks. As may be further observed from these figures, the larger the overlap the smaller the resulting block of compensated data.

As may be understood according to the present disclosure, with the same frequency domain filtering block size, for example, of 8192 samples, the frequency domain filtering circuitry—including FFT, frequency-domain filter coefficient multiplication, and iFFT functions—operates with lower duty cycle for shorter overlap operations. As a result, significant power savings is realized.

For example, when using a hardware pipelined architecture that operates at 100% duty cycle for the ½ block overlap, the duty cycle in ¼ block overlap mode will be ⅔ or 67% and the duty-cycle in ⅛ block overlap mode will be 4/7 or 57%. Advantageously, our method according to the present disclosure that adjusts the amount of overlap adds little hardware overhead. As may be readily appreciated, the circuitry performing the FFT, frequency domain filter coefficient multiplication and iFFT operations is the same as and shared for different modes but operates at a lower duty-cycle when the number of overlap samples is set lower—hence lower device power consumption.

Operationally, a method according to the present disclosure will operate in a manner involving the following steps:

A received optical signal—of single or dual polarizations, is down converted to baseband and sampled and quantized into a quadrature digital signal.

Any residual carrier frequency offset is substantially removed before any subsequent chromatic dispersion compensation.

For frequency-domain chromatic dispersion compensation, the quadrature digital signal stream(s) is/are applied to (a) block-wise FFT device(s), wherein the boundaries of the block is configured for a desired length of overlap as required by the overlap-save method. As may be understood, the overlap is typically smaller than or equal to half of the length of the block, and is decided based upon the length of the dispersion channel impulse response at the maximum dispersion value for a considered range of dispersion or transmission distance related to a particular application.

The block-wise FFT device(s) and/or the internal pipeline stages and devices are placed into a power-saving state during any gaps of operation related to the length of the overlap and further related to the range of dispersion and transmission distance. This power-saving state includes turning off the clock and/or power supply to the circuits performing these operations.

The output samples of the FFT are multiplied to an appropriate frequency domain filter coefficient to compensate any channel chromatic dispersion. The multiplication devices are placed into a power-saving state during the gaps of operation related to the length of overlap and further related to the range of dispersion and transmission distance. As before, the power-saving state includes turning off the clock and/or power supply to the multiplication circuit(s).

The multiplied FFT output samples are applied block-wise to iFFT device(s) in a manner similar to that of the FFT. More particularly, the block-wise iFFT device(s) and/or internal pipeline stages and devices are placed into a power-saving state during the gaps of operation related to the length of overlap and further related to the range of dispersion and transmission distance. The power-saving state for the iFFT device(s) include turning-off the clock and/or power supply to the iFFT circuit.

Finally, after the iFFT is performed, data output from the iFFT contains both desired compensated data and undesired overlap samples. The overlap samples may be ignored or removed, while the desired compensated data are sent to the next operation in the receiver data path.

Those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A method of operating circuitry for compensation of chromatic dispersion, comprising:
    receiving an optical signal through an optical fiber;
    obtaining, from the optical signal, a first time-domain block, the first time-domain block having a first duration;
    obtaining, from the optical signal, a second time-domain block, the second time-domain block having a second duration, wherein the second time-domain block overlaps the first time-domain block in a time domain by a third duration that is less than the first duration and the second duration;
    dynamically adjusting an overlap duration of time-domain blocks obtained from the optical signal subsequent to the first and second time-domain blocks based on a value indicative of a chromatic dispersion of the optical fiber, and then obtaining a third time-domain block and a fourth time-domain block having a fourth duration of overlap different than the third duration, the third and fourth time-domain blocks representing data obtained from the optical signal after the first and second time-domain blocks;
    obtaining a first frequency-domain block from the first time domain-block and a second frequency-domain block from the second time-domain block;
    multiplying the first frequency-domain block by a first frequency-domain filter coefficient to generate a first multiplication result and multiplying the second frequency-domain block by a second frequency-domain filter coefficient to generate a second multiplication result;
    inverse Fourier-transforming the first multiplication result and the second multiplication result; and
    setting the circuitry to a power-saving state during the third duration.

2. The method of claim 1, wherein setting the circuitry to the power-saving state comprises turning-off a clock signal.

3. The method of claim 1, wherein setting the circuitry to the power-saving state comprises turning-off a clock signal in correspondence to inverse Fourier-transforming the first multiplication result and the second multiplication result.

4. The method of claim 1, wherein the second duration is equal to the first duration.

5. The method of claim 4, wherein the third duration is equal to half the first duration.

6. The method of claim 4, wherein the third duration is equal to one fourth of the first duration.

7. The method of claim 1, wherein the first frequency-domain filter coefficient and the second frequency-domain filter coefficient are obtained from an impulse response of a channel associated with the optical fiber.

8. The method of claim 1, further comprising obtaining a polarization component from the optical signal, such that the first time-domain block and the second time-domain block are obtained from the polarization component.

9. The method of claim 1, further comprising mixing the optical signal with a local oscillator to obtain a baseband signal, such that the first time-domain block and the second time-domain block are obtained from the baseband signal.

10. The method of claim 1, wherein receiving the optical signal through the optical fiber comprises receiving the optical signal after the optical signal has traversed a distance greater than one thousand kilometers.

11. The method of claim 1, wherein obtaining the first frequency-domain block and the second frequency-domain block is performed through a Fast Fourier Transform (FFT) operation.

12. The method of claim 1, wherein inverse Fourier-transforming the first multiplication result and the second multiplication result is performed through an inverse Fast Fourier Transform (iFFT) operation.

13. The method of claim 1, wherein the first frequency-domain filter coefficient is equal to the second frequency-domain filter coefficient.

14. The method of claim 1, wherein setting the circuitry to the power-saving state comprises turning-off a power supply.

15. The method of claim 1, wherein setting the circuitry to the power-saving state comprises turning-off a power supply in correspondence to inverse Fourier-transforming the first multiplication result and the second multiplication result.

* * * * *